No. 892,633. PATENTED JULY 7, 1908.
E. WALKER.
ICE CREAM DIPPER.
APPLICATION FILED DEC. 1, 1905.
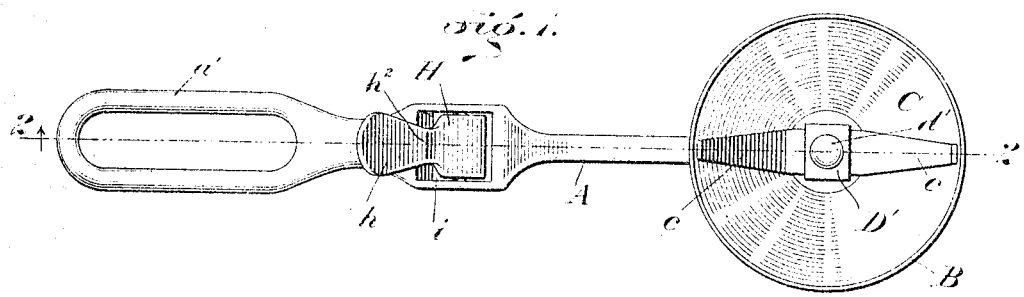
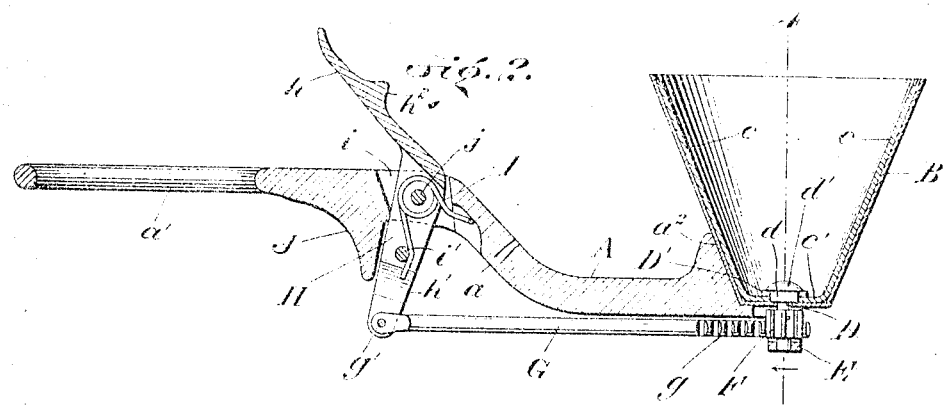
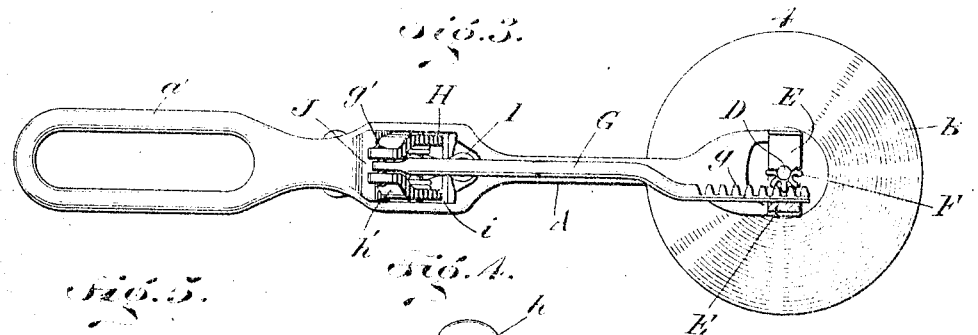
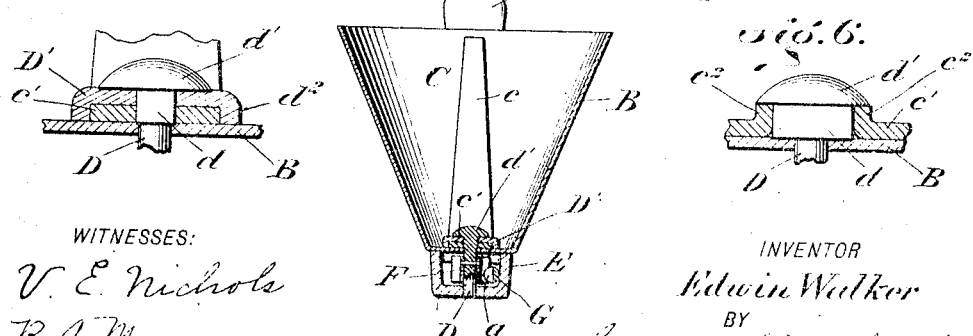
WITNESSES:
V. E. Nichols
R. A. Mooney
INVENTOR
Edwin Walker
BY
Griffin & Bernhard
ATTORNEYS

UNITED STATES PATENT OFFICE.

EDWIN WALKER, OF ERIE, PENNSYLVANIA.

ICE-CREAM DIPPER.

No. 892,633.      Specification of Letters Patent.      Patented July 7, 1908.

Application filed December 1, 1905. Serial No. 289,773.

*To all whom it may concern:*

Be it known that I, EDWIN WALKER, a citizen of the United States, residing at Erie, in the county of Erie and State of Pennsylvania, have invented certain new and useful Improvements in Ice-Cream Dippers, of which the following is a specification.

My invention relates to a device for dipping ice cream, or similar substances, and dispensing the same in predetermined quantities.

The object in view is to provide an implement adapted to be conveniently operated for the purpose of removing cream, or a similar substance, from a receptacle and discharging the same into a plate, or other container, the operations of dipping and of releasing and discharging the contents of the dipper being easily and quickly performed by one hand.

The new implement consists principally of a cup shaped container and means adapted to turn within said container for the purpose of overcoming the adhesion of the material to the walls of the container. Preferably, this releasing device is arranged to rotate within the container, and in one form of the invention said device is in the form of a skeleton scraper, the members of which lie close to the inner surface of the container.

My implement is provided with means for operating the scraper by the hand which grasps the handle or stock of the dipper. In one form of construction said operating means is a lever fulcrumed on the handle, and a rack pivoted to the lever, said rack being geared to the scraper. With the operating devices is combined a spring adapted to return the scraper to, or to maintain it in, one position, but this spring will yield or give to the pressure applied to the lever for the operation of the parts in order to free the cream from the container.

Reference is to be had to the accompanying drawings, forming a part of this invention, wherein like characters of reference are used to indicate corresponding parts in all the figures.

Figure 1 is a plan view, looking at the open side of the cup-shaped container; Fig. 2 is a vertical longitudinal section on the line 2—2 of Fig. 1; Fig. 3 is another plan view of the implement, looking at the closed side of the cup-shaped container; Fig. 4 is a vertical cross-section on the line 4—4 of Fig. 2; and Figs. 5 and 6 are details to be hereinafter described.

A designates a suitable shank or frame adapted to carry the several working parts of the implement. As shown, this frame A is bent or inclined at a point intermediate of its length, as at $a$, and one end of said frame is provided with a suitable handle $a'$.

B designates a container for the cream or other substance which is to be measured and dispensed by my implement. This container is shown in the form of a cup, closed at its small end, and open at its large end, the cup being, preferably, conical; but it will be understood that the cup may be made in any suitable shape and size. The frame A is formed at one end to provide a seat $a^2$ for the reception of the small end of the cup, the latter being made in a separate piece from the frame and secured by any suitable means to the seat portion $a^2$ thereof. It is my practice to make the cup B from a single piece of sheet metal, and to attach the same to an end portion of the frame A; but the method of making the cup and the material therefor, are not essential parts of this invention, because the cup may be made in one piece with the frame if desired.

It is well understood by those familiar with this art that in dispensing ice cream and other frozen or cold substances, there is a tendency of the substance to adhere to the walls of the container or cup B. In order to readily discharge the substance from the cup or container, I have provided means for scraping, cutting, or otherwise releasing the contents from engagement with the walls of the cup. In one form of my invention said means is represented as a scraper C, the same consisting of two members $c$, $c$, and a cross member $c'$. The scraper is made by stamping or cutting the same from a single strip or length of metal of the required thinness, and this scraper is bent to conform to the interior shape of the cup B, as clearly shown by Fig. 2. The members $c$ of the scraper lie close to and in contact with the inner surface of the cup, while the member $c'$ of said scraper fits snugly to the closed bottom of said cup.

The scraper C is adapted to rotate within the cup B for the purpose of making the scraper members $c$ sweep around the interior of the cup, and for the purpose of imparting this rotary motion to said scraper, I have provided means located exteriorly of the cup for operating the scraper. Preferably, the operating means are carried by the frame A, so that pressure may be applied to one member of said operating means by the hand which grasps the handle $a'$, thus enabling the implement to be operated in dipping and measuring the cream, and the scraper is turned within the dipper cup, so as to release the substance and facilitate the discharge thereof from said cup.

I will now proceed to describe a preferred form of the scraper operating means.

The shaft D is secured to the end portion $c'$ of the scraper, said shaft extending through the closed end of the cup, so as to be journaled in said end and in a guide E on the frame A, see Figs. 2 and 4. On the exposed end of the shaft D is a gear pinion F, which lies within the guide E. With this pinion engages the rack teeth $g$ of a slidable bar or rack G, the latter being disposed in compact relation to one side of the frame A, and extending lengthwise of the implement. This rack is operated by a lever H, which is fulcrumed in a slotted portion $i$ of the frame A. The lever H is of angular form, and at one end said lever has a thumb or operating piece $h$, while the other arm $h'$ of the lever is slotted or forked to receive the bar or rack G, whereby said bar or rack may be connected pivotally at $g'$ to said arm $h'$ of the lever. The several operating parts of the scraper are held normally in one position by the action of a spring I, the same being, preferably, coiled around the fulcrum pin $j$ of the lever H. One end of the spring is seated against the frame A, while the other end thereof acts on a stud or member $i'$, on the arm $h'$ of the lever. The thumb piece $h$ of said lever is quite close to the handle $a'$ of the implement, so that said thumb piece may be operated by pressure of the thumb, and to prevent the thumb from slipping along the piece $h'$, I provide the projection $h^2$ thereon. A guard J is made in one piece with the frame A, and lies close to the arm $h'$ of the lever, said guard operating to prevent the hand from engaging with the lever.

The guide E, heretofore mentioned, is made in one piece with, or suitably attached to, the frame A. The rack G is held in this guide, as shown by Fig. 4, so as to remain in engagement with the pinion F, the guide and the pinion being so disposed with relation to the rack as to keep the latter from having any idle or lost motion. The rack G is held in position by the pivotal connection $g'$ to the lever, and by the guide E.

I find in practice that there is a tendency of the scraper and the shaft D to separate or break, owing to the resistance offered by the frozen cream to the movement of the scraper within the cup, and to the strain which consequently takes place on the connection between said scraper and the shaft D. In order to strengthen the joint between these parts, I may resort to a number of expedients, two of which are shown by Figs. 5 and 6. In Fig. 5, the shaft D is provided with a shoulder $d$ and with a head $d'$. The shouldered part $d$ passes through an opening in the cross piece $c'$ of the scraper, and on this part $d'$ is fitted a reinforcing plate or washer D', the latter being secured to the cross piece $c'$ of said scraper in any suitable way. The reinforcement D' has its end portions doubled or folded around the cross piece $c'$, as indicated at $d^2$. The plate D' is attached to the scraper and to the shaft, so as to increase the metal at the point between said scraper and shaft, thereby materially strengthening the joint.

In Fig. 6 the cross piece $c'$ is shown as having the metal bent or flanged around the opening, so as to produce an eyelet $c^2$. This bent edge or eyelet of the scraper engages with and is fastened in a suitable way to, the shouldered part $d$ of the shaft, thus increasing the strength of the joint. I prefer, however, to employ the construction shown in Fig. 5, but it will be understood that my invention is not restricted to any particular means for strengthening the joint between the scraper and its shaft, because this detail may be modified by a skilled mechanic.

In using my implement it is held by one hand grasping the handle $a'$, and to dip the cream from the freezer or other receptacle, the cup B is forced into the substance so as to fill said cup, and thereby measure the cream. After withdrawing the dipper from the receptacle, the operator presses on the thumb piece $h$, so as to move the lever against the tension of the spring, thereby imparting endwise movement to the rack G, which rotates the scraper through the medium of the pinion F, and the shaft D. The members of the scraper are caused to travel or sweep the walls of the cup for the purpose of making the cream free from said cup, and by inverting the dipper, the cream or other contents of the cup is discharged into a plate or other receptacle. It will be seen that the operation of dipping, measuring and discharging the cream can all be performed by one hand, thus leaving the other hand free to hold and manipulate the plate or other receptacle.

In my implement the devices for operating the scraper are arranged so as to be out of the way in dipping cream from a freezer, said devices being on the opposite side of the frame from the open side of the cup, whereby the cream or other substance, will not lodge on the operating devices and clog them. The scraper and the shaft are so connected as to be removable from the cup for the purpose of cleaning, repairing or replacing the parts, because the gear F is simply pinned to the shaft D, thus allowing the shaft to be withdrawn from the cup, the gear, and the guide or boxing E. I prefer to use a frame or stock which is bent or offset, and to attach the cup to one end of the frame, because the bundle $a^1$ and the cup are so related as to balance the implement and thus allow it to be used to the best advantage. As shown by Figs. 2 and 3, the lever H has one arm slotted or forked for the accommodation of the spring, and said lever is fitted in a slotted part of the frame, thereby housing the spring and disposing the parts compactly. The projection $h^2$ prevents the thumb from slipping along the lever arm $h$, even though the same be slippery. The guard J and the handle prevents the fingers from being pinched between the lever and the frame, while also affording a pressure surface for the hand when forcing the dipper into cream or other hard substance.

Having thus described my invention, what I claim as new and desire to secure by Letters Patent is:—

1. In a device of the class described, a slotted frame having a handle, a container, a rotatable scraper within said container, a single lever extending transversely of the length of said frame and pivoted within said slotted frame, said lever having one arm above the handle and a second arm below the handle, and a single rack operatively connected with the scraper and pivoted to the lever.

2. In a device of the class described, a frame provided with a handle, a container, a rotatable scraper within the container, a shaft for the scraper depending therefrom exteriorly of the container, a pinion on the shaft, a lever pivoted to the handle with one arm extending above the handle and another arm below the handle, a rack operated by said lower arm of the lever for actuating the aforesaid gear, and a housing depending from the frame and serving as a support for the said scraper shaft and also as a guide for the rack.

3. In a device of the class described, a one-piece frame bent intermediate of its length, a container fixed at one end to the frame amd projecting beyond one side thereof, a scraper within the container, a single lever extending transversely across the frame, said lever being fulcrumed at a point intermediate of its length to the frame, said fulcrum being connected to the frame adjacent to the bent part thereof, and devices connecting one arm of said lever with the scraper for operating the latter, the other arm of the lever being exposed for convenient operation by hand.

4. In a device of the class described, a slotted frame, a lever extending transversely of the length of the frame and through the slot therein, a fulcrum for supporting said lever in the slotted part of the frame, a container, a scraper, means connecting the lever with the scraper, and a spring housed within the slotted part of said frame and exerting its tension on the lever.

5. In a device of the class described, a frame, a container thereon, a lever fulcrumed on the frame, said lever being longitudinally slotted or forked, a spring housed within the slotted or forked part of said lever, said spring exerting its tension on the lever, a scraper within the container, and means operatively connecting the lever and the scraper.

6. A device of the class described, comprising an integral handle and frame, a container carried by said frame, a scraper within the container, a shaft journaled in the container and attached to the scraper, the joint between said shaft and the scraper being reinforced by an extra thickness of metal around the shaft, a lever fulcrumed on the frame, having one arm above said frame and another arm below it, and means operatively connecting one arm of the lever and the scraper shaft.

7. A device of the class described comprising a frame, a container thereon, a scraper within the container, a shaft provided with a shouldered part which fits in the scraper, a reinforcing plate attached to the scraper and engaging with said shouldered part of the shaft, and means for turning the scraper.

8. A device of the class described comprising a frame, a container thereon, a housing exteriorly of the container, a scraper within said container, a shaft attached to the scraper, said shaft being journaled in the container and stepped in the housing, an operating lever and a rack geared to the shaft and pivoted to said lever, said rack being guided by the housing.

9. A device of the class described comprising a frame, a container thereon, a scraper within the container, a housing exteriorly of the container, and extending across the closed end thereof, a shaft extending from the scraper, and journaled in the container and in the housing, a gear fitted removably on the shaft and located within the housing, said scraper and the shaft being withdrawable through the container, a single rack meshing with the gear and guided by the housing, and a lever fulcrumed on the frame and connected to said rack.

10. A device of the class described comprising a frame, provided with a handle, said frame being offset or bent intermediate of its length, and provided in said offset or bent portion with a slot, a container attached to the frame, a scraper within the container, a lever fulcrumed on the frame, said lever having one arm below said frame and the other arm above said frame, and a single rack lying close to one part of the frame, which is adapted to serve as a guard for said rack, said rack being connected to one arm of the lever and adapted to operate the scraper.

11. A device of the class described comprising a frame having a slot, and a handle, a lever fulcrumed within the slotted part of the frame, said lever having two arms extending beyond the respective sides of the frame, a pressure piece projecting from one side of the frame, a container on the frame, a scraper within the container, and means operatively connecting the scraper and one arm of said lever.

12. In a device of the class described, a slotted frame provided with a handle, a container carried by said frame, a scraper within said container, a lever within and extending through said slot of the frame, the two arms of said lever extending respectively above and below said frame, a pivot within said slot on which the lever rocks, a spring supported by said pivot and acting on the lever, and means connected with one arm of said lever for operating the scraper.

In testimony whereof I have signed my name to this specification in the presence of two subscribing witnesses.

EDWIN WALKER.

Witnesses:
H. I BERNHARD,
V. E. NICHOLS.